(12) United States Patent
Hasunuma et al.

(10) Patent No.: US 7,097,371 B2
(45) Date of Patent: Aug. 29, 2006

(54) KEYTOP

(75) Inventors: Seigo Hasunuma, Gunma (JP); Yutaka Sanda, Gunma (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 10/778,715

(22) Filed: Feb. 13, 2004

(65) Prior Publication Data

US 2004/0165925 A1    Aug. 26, 2004

(30) Foreign Application Priority Data

Feb. 21, 2003    (JP)    ............................. 2003-043770

(51) Int. Cl.
*G01D 11/28*    (2006.01)

(52) U.S. Cl. ...................... 400/490; 400/493; 200/341; 200/345

(58) Field of Classification Search ................ 400/490, 400/493, 495; 200/341, 345; 345/168
See application file for complete search history.

(56) References Cited

U.S. PATENT DOCUMENTS

| | | | | |
|---|---|---|---|---|
| 4,748,046 | A | * | 5/1988 | Kuboki et al. .............. 427/510 |
| 5,036,440 | A | * | 7/1991 | Takii et al. ................... 362/95 |
| 5,404,133 | A | * | 4/1995 | Moriike et al. ........ 340/815.56 |
| 6,036,326 | A | * | 3/2000 | Yoshikawa et al. ........... 362/23 |
| 6,358,519 | B1 | * | 3/2002 | Waterman ................... 424/404 |
| 6,384,171 | B1 | * | 5/2002 | Yamazaki et al. ............ 528/15 |
| 2003/0107554 | A1 | * | 6/2003 | Motegi ....................... 345/168 |
| 2003/0145762 | A1 | * | 8/2003 | Richardson et al. ... 106/163.01 |
| 2003/0207202 | A1 | * | 11/2003 | Fujita et al. ............. 430/270.1 |

FOREIGN PATENT DOCUMENTS

| | | |
|---|---|---|
| JP | 5960824 | 4/1984 |
| JP | 59171414 | 9/1984 |
| JP | 61008390 | 1/1986 |
| JP | 62237618 | 10/1987 |
| JP | 7-24748 | 6/1995 |

* cited by examiner

*Primary Examiner*—Daniel J. Colilla
*Assistant Examiner*—Kevin Williams
(74) *Attorney, Agent, or Firm*—David N. Lathrop, Esq.; Gallagher & Lathrop

(57) ABSTRACT

In a keytop in which a mark indicating a function of the corresponding key switch is printed on the top surface of a keytop body made of a synthetic resin, the mark being a letter, a character, a numeral, a word, a symbol, a sign, a figure, a pattern or the like, or any combination thereof, and the mark is coated with a resin coating, a transparent or semitransparent coating that is soft, not slippery, and lusterless, is applied on the whole surface of the keytop body including the resin coating. Such transparent or semitransparent coating gives a soft feeling to the tip of an operator's finger as well as the tip thereof is hard to slip off the keytop, and hence the feeling thereof on operation is comfortable and the operativity thereof is satisfactory. Moreover, a line of the contour of the resin coating becomes disappeared and it is possible to completely take off the luster thereof. Accordingly, a grade in the external appearance of the keytop can be improved.

6 Claims, 2 Drawing Sheets

PRIOR ART

KEYTOP

BACKGROUND OF THE INVENTION

1. Field of the Invention

The present invention relates to a keytop in a keyboard used in a personal computer, a word processor or the like and/or of a key switch used in an IC electronic dictionary, an electronic desk or pocket calculator or the like.

2. Description of the Related Art

As is well known, there have been provided many key switches corresponding to a predetermined key arrangement in a keyboard used in a personal computer, a word processor or the like, and on the top or upper surface of a keytop (keybutton) of each of the key switches is put or applied a letter, a character, a numeral, a word, a symbol, a sign, a figure, a pattern or the like, or any combination thereof each indicating a function of each key switch. A letter, a character, a numeral, a word, a symbol, a sign, a figure, a pattern or the like, or any combination thereof applied on the top surface of each keytop is abraded by repetitively touching it with the tip of a finger so that it becomes blurry or it disappears. For that reason, there has been proposed a keytop in which a letter, a character, a numeral, a word, a symbol, a sign, a figure, a pattern or the like, or any combination thereof applied on the top surface thereof has been coated with a hard resin layer to improve the resistance to abrasion thereof. Here, in the specification, a term "mark" will be used as a generic term for a letter, a character, a numeral, a word, a symbol, a sign, a figure, a pattern or the like, or any combination thereof applied on the upper surface of each keytop.

For example, there has been disclosed in Japanese Unexamined Patent Application Publication No. 59-060824 that was published on Apr. 6, 1984, a keytop on the top surface of which is applied a mark indicating the function of the corresponding key switch and having a transparent synthetic resin applied on the top surface of the keytop including the mark to form a protection layer against abrasion. There has been also disclosed in Japanese Unexamined Patent Application Publication No. 59-171414 that was published on Sep. 27, 1984, a keytop on the top surface of which is applied a mark indicating the function of the corresponding key switch and having a transparent radiation-setting resin applied on the top surface of the keytop including the mark to form a protection layer against abrasion. There has been also disclosed in Japanese Unexamined Patent Application Publication No. 61-008390 that was published on Jan. 16, 1986, a keytop on the top surface of which is printed a mark indicating the function of the corresponding key switch and having a transparent paint applied on the top surface of the keytop including the mark to form a protection layer against abrasion. There has been also disclosed in Japanese Unexamined Patent Application Publication No. 62-237618 that was published on Oct. 17, 1987, a keytop on the top surface of which is printed a mark indicating the function of the corresponding key switch and having a protection layer of an ultraviolet-setting resin formed on the top surface of the keytop including the mark by a tampo printing (also called tampon printing). There has been also disclosed in Japanese Examined Utility Model Application Publication No. 07-024748 that was published on Jun. 5, 1995, a keytop on the top surface of which is printed a mark indicating the function of the corresponding key switch and having a protection film of a transparent or semitransparent hard type ink formed on only the mark portion of the top surface of the keytop by a pad printing (the same printing method as that of the tampo printing).

There will be described in detail with reference to FIGS. 3 and 4 one example of the prior art keytop having the same construction as that of the keytop disclosed in the aforesaid Japanese Examined Utility Model Application Publication No. 07-024748. FIG. 3 is a plan view of the keytop, and FIG. 4 is an enlarged sectional view taken along the line 4—4 in FIG. 3 and looking in the direction indicated by the arrows. A keytop body 11 having a generally square shape in plan is made of a synthetic resin, for example, an ABS (acrylonitrile butadiene styrene) resin. On the top or upper surface of the keytop body 11 are printed two marks (two letters one being an English letter and the other being a Japanese letter, in this example) 12 each indicating the function of the corresponding key switch that is adapted to operate by the keytop, and further, a resin coating 13 is applied on only a portion of the upper surface on which each mark 12 has been printed so that the marks 12 are coated with the resin. Thus, the keytop is formed.

The marks 12 are printed on the upper surface of the keytop body 11 by a silk printing, a tampo printing, or the like. In addition, the resin coatings 13 covering only the portions of the marks 12 are carried out by use of a hard resin such as an ultraviolet-setting (UV-setting) resin or the like, in this example. Such resin coatings 13 can be applied on only the portions of the marks 12 by use of, for example, a tampo printing, as described in the above-mentioned Japanese Examined Utility Model Application Publication No. 07-024748.

There have been proposed keytops each having its keytop body 11 on the overall upper surface of which is formed a coating of a hard resin protecting the marks 12 from being abraded besides that the hard resin coating is applied on only the portions of the marks 12 as the example shown in the figure. In case the resin coating is applied on the overall upper surface of the keytop body 11, it is formed thereon not by use of a tampo printing, but by application of a hard resin solution on the overall upper surface of the keytop body by use of, for example, a spray gun.

As discussed above, in the prior art, the marks 12 each indicating the function of the corresponding key switch have been coated with a transparent or semitransparent hard resin to form a protection layer against abrasion so that the durability (the resistance to abrasion) of the keytop has been increased.

However, in the prior art keytop constituted as discussed above, both the keytop body 11 made of a synthetic resin and the resin coating 13 formed by use of a hard resin such as an ultraviolet-setting resin or the like are hard, and hence an operator's feeling or tactile impression when the operator touches the keytop in operation becomes hard, which results in a disadvantage that it could not be said that the feeling on operation of the keytop is comfortable. In addition, since the keytop is constituted by a hard resin, the tip of a finger is comparatively easy to slip thereon and there leaves a room for improvement in operativity or maneuverability thereof.

Moreover, as shown in FIGS. 3 and 4, in case the resin coating 13 is partly applied on only a portion of the upper surface of the keytop body on which each mark 12 has been printed, a line of the contour of the resin coating 13 is visually identified (caught by eyes), and there is a disadvantage that a grade or quality in the external appearance (high-grade impression) of the keytop is lost.

SUMMARY OF THE INVENTION

An object of the present invention is to provide a keytop that has comfortable feeling on operation thereof and is superior in operativity or maneuverability thereof.

Another object of the present invention is to provide a keytop that has high grade in the external appearance thereof.

In order to accomplish the foregoing objects, in an aspect of the present invention, there is provided a keytop which comprises: a keytop body that is made of a synthetic resin; and a transparent or semitransparent coating that is soft, not slippery, and lusterless, the coating being applied on the surface of the keytop body.

In another aspect of the present invention, there is provided a keytop which comprises: a keytop body that is made of a synthetic resin; at least one mark that is printed on the surface of the keytop body and indicates a function of the corresponding key switch, the mark being a letter, a character, a numeral, a word, a symbol, a sign, a figure, a pattern or the like, or any combination thereof; a resin coating that covers the mark; and a transparent or semitransparent coating that is soft, not slippery, and lusterless, the transparent or semitransparent coating being applied on the surface of the keytop body including the resin coating.

It is preferable that as the ingredients of the transparent or semitransparent coating that is soft, not slippery, and lusterless are contained a polyurethane resin, a silicone elastic substance, a hardener or curing agent, and a fluidizing agent.

An anti-bacterial agent may be added as one of the ingredients of the transparent or semitransparent coating that is soft, not slippery, and lusterless.

The transparent or semitransparent coating that is soft, not slippery, and lusterless may be formed by applying on the surface of the keytop body a paint in which a polyurethane resin, a silicone elastic substance, a hardener or curing agent, and a fluidizing agent are mixed.

Alternatively, the transparent or semitransparent coating that is soft, not slippery, and lusterless may be formed by applying on the surface of the keytop body a paint in which a polyurethane resin, a silicone elastic substance, a hardener or curing agent, a fluidizing agent, and an anti-bacterial agent are mixed.

In accordance with the keytop constituted as mentioned above, a feeling on touching a keytop with the tip of an operator's finger is soft and the tip of the operator's finger is hard to slip off the keytop. Accordingly, the feeling or tactile impression thereof on operation is comfortable and the operativity or maneuverability thereof is also satisfactory. In addition, in case a resin coating is partly applied on only a portion of the surface of a keytop on which a mark is printed, a line of the contour of the resin coating becomes disappeared and invisible by applying on the whole surface of the keytop the transparent or semitransparent coating that is soft, not slippery, and lusterless. Accordingly, it is possible to improve a grade or quality in the external appearance of the keytop.

DETAILED DESCRIPTION OF THE PREFERRED EMBODIMENTS

The preferred embodiment of the present invention will now be described in detail with reference to FIGS. 1 and 2. The present invention may, however, be embodied in many different forms and should not be construed as limited to the embodiment set forth hereinafter; rather, the embodiment is provided so that this disclosure will be thorough and complete, and will fully convey the scope of the invention to those skilled in the art.

Figure 1:
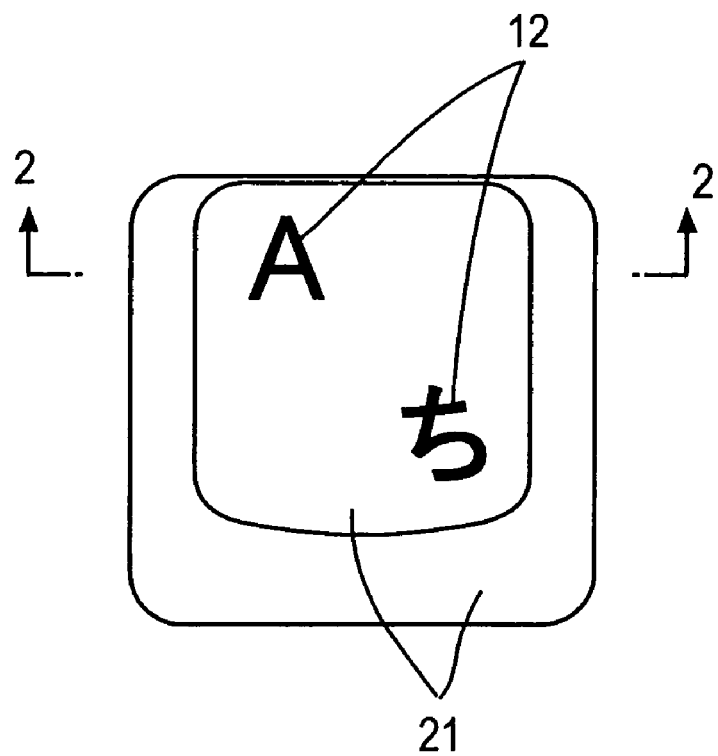
FIG. 1 is a plan view showing an embodiment of the keytop according to the present invention.
Figure 2:
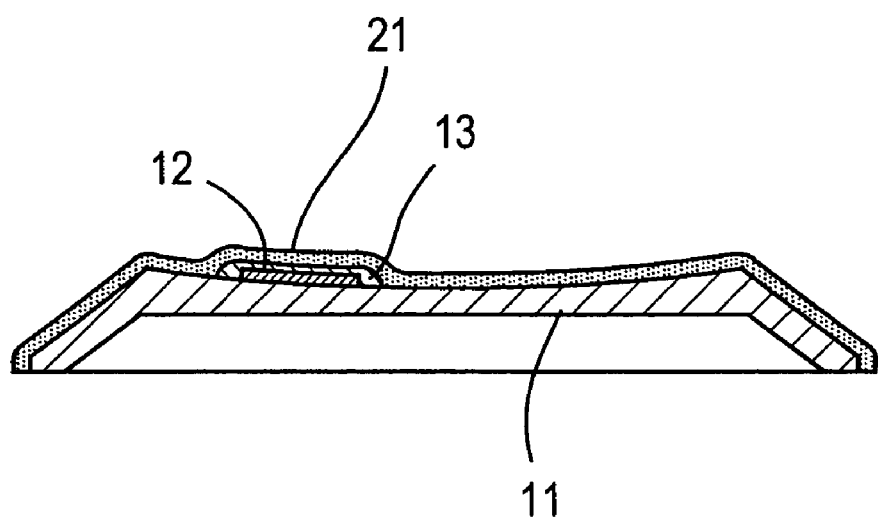
FIG. 2 is an enlarged sectional view taken along the line 2—2 in FIG. 1 and looking in the direction indicated by the arrows.

FIG. 1 is a plan view showing an embodiment of the keytop according to the present invention, and FIG. 2 is an enlarged sectional view taken along the line 2—2 in FIG. 1 and looking in the direction indicated by the arrows. Further, for brevity of explanation, in FIGS. 1 and 2, portions and elements corresponding to those in FIGS. 3 and 4 will be denoted by the same reference numbers or characters attached thereto, and explanation thereof will be omitted unless necessary. In addition, a term "mark" will be used hereinafter as a generic term for a letter, a character, a numeral, a word, a symbol, a sign, a figure, a pattern or the like, or any combination thereof applied on the surface of each keytop.

In this embodiment, like the prior art mentioned above, a keytop body 11 having a generally square shape in plan is made of a synthetic resin, for example, an ABS resin, and on the top or upper surface of the keytop body 11 are printed two marks (two letters one being an English letter and the other being a Japanese letter, in this embodiment) 12 each indicating the function of the corresponding key switch that is adapted to operate by a depression of the keytop. In addition, a resin coating 13 is applied on only a portion of the upper surface on which each mark 12 has been printed so that the marks 12 are coated with the resin coatings 13 respectively.

This embodiment is characterized in that the keytop is further includes a transparent coating 21 that is soft, not slippery or smooth, and lusterless, the transparent coating 21 being applied on the whole upper surface of the keytop body 11 including the resin coatings 13 partly applied. This transparent coating that is soft, not slippery, and lusterless is hereinafter referred to simply as "outer coating". The outer coating 21 contains as its ingredients, in this embodiment, a polyurethane resin, a silicone elastic substance, a hardener or curing agent, a fluidizing agent, and an anti-bacterial agent, and the outer coating 21 has been formed on the surface of the keytop by applying a paint in which these ingredients have been mixed on the whole upper surface of the keytop body 11 including the resin coatings 13 by use of, for example, a spray gun. Further, the fluidizing agent has been added therein to maintain the dispersion and fluidity of the paint for forming the outer coating 21 (to control the viscosity of the paint).

The contents of the ingredients of the outer coating 21 are as follows in this embodiment:

polyurethane resin: 86.6% (+3.4% and −1.6%), namely, 85 to 90% silicone elastic substance: 7%±1%, namely, 6 to 8% curing agent: 6%±1%, namely, 5 to 7% fluidizing agent: 0.2%±0.1%, namely, 0.1 to 0.3% anti-bacterial agent: 0.2%±0.1%, namely, 0.1 to 0.3%

As the curing agent has been used Ethyl isocyanoacetate represented by the molecular formula $CH(C_6H_4NCO)_3$, and as the anti-bacterial agent has been used n-octyl-4-isothiazol-3-one that is one of the isothiazole system anti-bacterial agent. The thickness of the outer coating 21 has been about 20 μm, but it may be 20 to 30 μm or so.

The outer coating 21 having its ingredients stated above has been soft (rubbery), not slippery, and yet mat or lusterless as well as transparent. Moreover, since it is transparent, an operator could have identified visually and fully the marks printed on the upper surface of the keytop body 11.

With the keytop constituted as described above, the overall surface of the keytop body 11 is coated with the outer coating 21 having the above-mentioned features, and hence when an operator touches the keytop, a soft feeling or tactile impression is conducted to the tip of the operator's finger, which results in a comfortable touch of the keytop on operation. In addition, any slippage between the tip of the operator's finger and the keytop is restrained on operation of the keytop, and so the operativity or maneuverability thereof is improved. Accordingly, when the operator operates the keytop constituted as discussed above, he can really feel the high-grade impression thereof.

Figure 3:
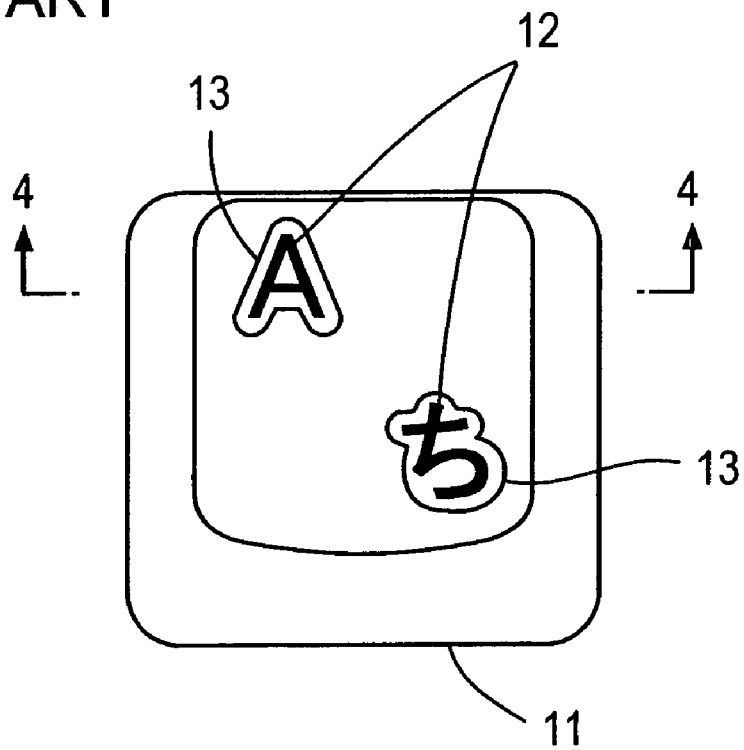
FIG. 3 is a plan view showing an example of the prior art keytop.
Figure 4:
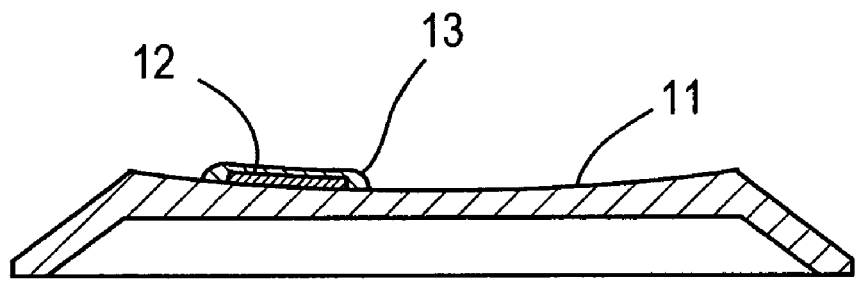
FIG. 4 is an enlarged sectional view taken along the line 4—4 in FIG. 3 and looking in the direction indicated by the arrows.

Moreover, in order to protect the marks 12 from being abraded, in this embodiment, the hard resin coatings 13 such as an ultraviolet-setting resin or the like are also partly applied on only portions of the upper surface of the keytop body 11 on which the marks 12 have been printed, as in the prior art keytop shown in FIGS. 3 and 4. However, in the embodiment, the hard resin coatings 13 are covered thereon with the outer coating 21 having the above-stated ingredients, and therefore, a line of the contour of each resin coating 13 (a line indicating the area of the resin coating 13) is disappeared and invisible as shown in FIG. 1. As a result, there is improved a grade or quality in the external appearance of the keytop and the operator can really feel the high-grade impression thereof visually as well.

In addition, in order to make the marks 12 easy to see, it is generally required that the upper surface of the keytop constitutes a lusterless or mat surface. Such lusterless surface is easily realized by use of the outer coating 21 having the above-stated ingredients and it is possible to completely take off the luster or gloss of each of the resin coatings 13.

Furthermore, since an anti-bacterial agent is contained as one ingredient of the outer coating 21, in the embodiment, there is obtained an advantage that the anti-bacterial effect is also gotten.

In the above-stated embodiment, the outer coating 21 has been formed on the surface of the keytop by applying the paint for forming the outer coating that has its composition described above, on the surface of the keytop by use of a spray gun. It is needless to say that the outer coating 21 may be formed on the surface of the keytop by another means other than a spray gun.

In addition, the outer coating 21 having the above-stated ingredients has been applied on the surface of the keytop having the marks 12 and the hard resin coatings 13 covering the marks 12. However, the outer coating having the above-stated ingredients may be applied on the surface of a keytop having no mark printed on the upper surface thereof such as, for example, a "space key" in the keyboard of a personal computer. There can be obtained a keytop that has a comfortable touch on operation, an increased operativity or maneuverability and the high-grade impression by application of the outer coating on the surface thereof, as in the above embodiment.

Moreover, the present invention may also be applied to a keytop (push button) of each of key switches used in an IC electronic dictionary, an electronic desk or pocket calculator, a PDA (Personal Digital Assistant), a mobile phone, a telephone or the like, which will result in a keytop that has a comfortable touch on operation, an increased operativity or maneuverability and the high-grade impression, as in the above embodiment.

Further, since the coating applied on the overall surface of the keytop body 11 may be a transparent or semitransparent coating that is soft, not slippery, and lusterless, the ingredients of the outer coating 21 are not limited to those in the embodiment. Likewise, it goes without saying that the ingredients and the contents of the paint for forming the outer coating are not limited to those in the above embodiment.

As is clear from the foregoing description, according to the present invention, a feeling on touching a keytop with the tip of an operator's finger is soft and the tip of the operator's finger is hard to slip off the keytop. Accordingly, there can be provided the keytop in which the feeling or tactile impression thereof on operation is comfortable and the operativity or maneuverability thereof is also satisfactory. In addition, in case a resin coating is partly applied on only a portion of the surface of a keytop on which a mark is printed, a line of the contour of the resin coating (a line indicating the area of the resin coating) becomes disappeared and invisible by the outer coating. As a result, it is possible to improve a grade or quality in the external appearance of the keytop.

While the present invention has been described with regard to the preferred embodiment shown by way of example, it will be apparent to those skilled in the art that various modifications, alterations, changes, and/or minor improvements of the embodiment described above can be made without departing from the spirit and the scope of the present invention. Accordingly, it should be understood that the present invention is not limited to the illustrated embodiment, and is intended to encompass all such modifications, alterations, changes, and/or minor improvements falling within the scope of the invention defined by the appended claims.

What is claimed is:

1. A keytop comprising:
    a keytop body that is made of a synthetic resin and has a top surface region that an operator finger may touch;
    at least one mark that is printed on the top surface region of said keytop body and that indicates a function of a corresponding key switch, said mark being a letter, a character, a numeral, a word, a symbol, a sign, a figure, a pattern or the like, or any combination thereof;
    a partial resin coating that-having a contour, wherein said partial resin coating covers the mark and only part of the top surface region; and
    an outer coating that is transparent or semitransparent, soft, not slippery, and lusterless, and covers the top surface region of the keytop body including said partial resin coating such that the contour of said partial resin coating is not visible.

2. The keytop as set forth in claim 1, wherein the outer coating includes an anti-bacterial agent.

3. The keytop as set forth in claim 1, wherein the outer coating includes a paint having a mixture of a polyurethane resin, a silicone elastic substance, a hardener or curing agent, and a fluidizing agent.

4. The keytop as set forth in claim 2, wherein the outer coating includes a paint having a mixture of a polyurethane resin, a silicone elastic substance, a hardener or curing agent, a fluidizing agent, and an anti-bacterial agent.

5. The keytop as set forth in claim 1, wherein the partial resin coating is made of a hard resin.

6. The keytop as set forth in claim 2, wherein the partial resin coating is made of a hard resin.

* * * * *